United States Patent
Miyazaki et al.

(10) Patent No.: US 7,533,755 B2
(45) Date of Patent: May 19, 2009

(54) SHIFT-LEVER DEVICE FOR A VEHICLE

(75) Inventors: Takeshi Miyazaki, Miki (JP); Hiroyuki Fujimoto, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 268 days.

(21) Appl. No.: 11/228,028

(22) Filed: Sep. 14, 2005

(65) Prior Publication Data

US 2006/0060018 A1 Mar. 23, 2006

(30) Foreign Application Priority Data

Sep. 17, 2004 (JP) ............................. 2004-270770

(51) Int. Cl.
*F16H 59/002* (2006.01)
(52) U.S. Cl. .................... 180/336; 74/473.1; 74/473.2; 74/473.33
(58) Field of Classification Search ................ 180/336; 74/473.1, 473.2, 473.3, 473.33
See application file for complete search history.

(56) References Cited

U.S. PATENT DOCUMENTS

| | | | | | |
|---|---|---|---|---|---|
| 2,349,297 | A | * | 5/1944 | Neracher et al. | 74/346 |
| 3,460,279 | A | * | 8/1969 | Martin | 37/417 |
| 3,566,711 | A | * | 3/1971 | Leuenberger | 74/483 R |
| 4,425,976 | A | * | 1/1984 | Kimura | 180/56 |
| 5,144,854 | A | * | 9/1992 | Herzog et al. | 74/473.22 |
| 5,327,989 | A | * | 7/1994 | Furuhashi et al. | 180/248 |
| 5,372,050 | A | * | 12/1994 | Shinki et al. | 74/473.31 |
| 5,598,740 | A | * | 2/1997 | Itoh | 74/473.23 |
| 6,029,536 | A | * | 2/2000 | Sugiyama | 74/473.31 |
| 6,186,263 | B1 | * | 2/2001 | Takano | 180/336 |
| 6,257,084 | B1 | * | 7/2001 | Yoshina et al. | 74/359 |
| 6,325,166 | B1 | * | 12/2001 | Shimada et al. | 180/6.48 |
| 6,492,805 | B1 | * | 12/2002 | Wakabayashi et al. | 324/173 |
| 6,647,821 | B2 | * | 11/2003 | Ruckert et al. | 74/473.3 |
| 6,786,108 | B2 | * | 9/2004 | Luh | 74/473.33 |
| 6,817,263 | B2 | * | 11/2004 | Miguchi | 74/473.3 |
| 6,820,515 | B2 | * | 11/2004 | Ikeya | 74/473.3 |
| 6,857,499 | B2 | * | 2/2005 | Kawamoto et al. | 180/336 |
| 6,904,825 | B2 | * | 6/2005 | Arai et al. | 74/473.32 |

(Continued)

FOREIGN PATENT DOCUMENTS

JP 2000-225866 8/2000

(Continued)

*Primary Examiner*—John Q. Nguyen
*Assistant Examiner*—Timothy Wilhelm
(74) *Attorney, Agent, or Firm*—Alleman Hall McCoy Russell & Tuttle LLP

(57) ABSTRACT

A shift-lever device of a vehicle is provided. The device includes a single shift lever provided so as to be pivotable, and a gate plate having a gate through which the shift lever is inserted up to a predetermined length to guide a shift operation thereof. The device is configured to be coupled with a single shift shaft of a gear transmission mechanism through a single push-pull cable so as to operate the shift shaft. The transmission is configured so that the shift shaft interlocks with a single shift fork to shift gears of the transmission. The gate has a shape such that the shift lever is movable more greatly at each of shift positions as much as a clearance between an outer casing and inner cable of the cable.

5 Claims, 8 Drawing Sheets

U.S. PATENT DOCUMENTS

| | | | |
|---|---|---|---|
| 6,904,996 B2* | 6/2005 | Mita et al. | 180/336 |
| 6,935,453 B2* | 8/2005 | Mizuta et al. | 180/235 |
| 7,000,727 B2* | 2/2006 | Korenjak et al. | 180/292 |
| 7,013,748 B2* | 3/2006 | Satoh et al. | 74/473.12 |
| 7,104,150 B2* | 9/2006 | Ito et al. | 74/335 |
| 2001/0027891 A1* | 10/2001 | Suzuki et al. | 180/336 |
| 2002/0124674 A1* | 9/2002 | Ha et al. | 74/473.3 |
| 2003/0034195 A1* | 2/2003 | Rioux et al. | 180/292 |
| 2003/0106387 A1* | 6/2003 | Lee | 74/473.21 |
| 2004/0000209 A1* | 1/2004 | Nagasawa | 74/473.3 |
| 2004/0025616 A1* | 2/2004 | Luh | 74/473.3 |
| 2004/0182191 A1* | 9/2004 | Kondo et al. | 74/473.3 |
| 2004/0222028 A1* | 11/2004 | Mizuta et al. | 180/235 |
| 2004/0235615 A1* | 11/2004 | Deguchi | 477/43 |
| 2005/0126834 A1* | 6/2005 | Davies | 180/53.1 |
| 2005/0173180 A1* | 8/2005 | Hypes et al. | 180/292 |
| 2005/0217947 A1* | 10/2005 | Honda et al. | 188/1.11 W |
| 2006/0058148 A1* | 3/2006 | Miyazaki et al. | 475/200 |
| 2006/0060018 A1* | 3/2006 | Miyazaki et al. | 74/473.1 |

FOREIGN PATENT DOCUMENTS

| | | |
|---|---|---|
| JP | 2002-144907 | 5/2002 |
| JP | 2002-264679 | 9/2002 |

* cited by examiner

SHIFT-LEVER DEVICE FOR A VEHICLE

TECHNICAL FIELD

The present invention relates to a shift-lever device for a vehicle equipped with a gear transmission mechanism in which a gear is shiftable by a single shift fork, the shift-lever device being connected to the gear transmission mechanism by a push-pull cable.

BACKGROUND OF THE INVENTION

Typically, all-terrain vehicles or ATVs are equipped with a gear transmission mechanism which is configured to be shiftable by a single shift fork. A shift-lever device is installed on a floor in proximity to a driver's seat. The shift-lever device is configured so that it shifts a gear of the gear transmission mechanism between Forward High (H), Forward Low (L), Neutral (N), and Reverse (R).

This kind of shift-lever device is connected to the gear transmission mechanism provided behind the driver's seat with a rigid tie rod which extends in the longitudinal direction of the vehicle. An operation of the shift lever moves the tie rod in the longitudinal direction thereof so that the tie rod rotates a shift shaft of the gear transmission mechanism to move a shift fork attached to the shift shaft to a position corresponding to the operation of the shift lever.

The shift lever is configured so that it is inserted through a gate of a gate plate which is disposed around halfway along the longitudinal direction of the shift lever. The shift lever is pivoted with two-degrees-of-freedom at a lower end thereof. A pivoting movement of the shift lever is guided by the gate and limited to the gate shape (see, for example, Japanese Patent Publication Unexamined No. 2002-264679 and Japanese Patent Publication Unexamined No. 2002-144907).

In the shift-lever device of the above kind, due to the connection of the transmission mechanism by the linear, rigid tie rod, the disposed position of the shift-lever device is limited to, for example, a position in proximity to the gear transmission mechanism and/or along a straight line from the shift shaft of the gear transmission mechanism (see, for example, Japanese Patent Publication Unexamined No. 2002-144907).

Another type of shift-lever device includes a flexible push-pull cable instead of the rigid tie rod. This push-pull cable reduces the limitation of the disposed position of the shift-lever device. For example, the shift-lever may be disposed in a dashboard, on either right-hand or left-hand side of a steering handle disposed typically above the driver's seat (see, for example, Japanese Patent Publication Unexamined No. 2000-225866).

However, it is known that there exists a clearance inside the push-pull cable between an internal peripheral surface of an outer casing and an outer peripheral surface of an inner cable inserted through the casing. Due to the clearance, misalignment in a rotational position of the shift shaft may occur when the inner cable is pushed or pulled by the shift lever. As a result, the shift fork may not move to an appropriate position, and thus a gear shift may not be carried out correctly. The misalignment can be much larger than with a tie rod, and it increases with length and number of bends of the push-pull cable when installed in the vehicle.

BRIEF SUMMARY OF THE INVENTION

The present invention addresses the above conditions and provides an improved shift-lever device for a vehicle equipped with a gear transmission mechanism in which a gear is shiftable by a single shift fork. The present invention especially provides the shift-lever device connected to the gear transmission mechanism by a push-pull cable.

The shift-lever device being disposed in proximity to one side of a steering handle of a vehicle includes a single shift lever provided so as to be pivotable, and a gate plate having a gate through which the shift lever is inserted up to a predetermined length to guide a shift operation thereof. The shift-lever device is configured to be coupled with a single shift shaft of a gear transmission mechanism through a single push-pull cable so as to operate the single shift shaft. The gear transmission mechanism is configured so that the single shift shaft interlocks with a single shift fork to shift gears of the gear transmission mechanism. The gate has a shape such that the shift lever is movable more greatly at each of shift positions as much as a clearance between an outer casing and an inner cable of the push-pull cable.

The gate may include a main passage, which extends substantially in the front-and-rear direction of the vehicle, for guiding the shift lever in a direction which the shift lever pushes and pulls the push-pull cable, and a plurality of sub-passages. The plurality of sub-passages extend to one side of the main passage, substantially perpendicular to the main passage from each of shift positions along the main passage corresponding to gear positions of the shift fork, for sustaining the shift lever to the shift position. One of the plurality of sub-passages may correspond to a Neutral position of the gear transmission mechanism, while at least one of other sub-passages may be expanded to a distal side from the sub-passage corresponding to the Neutral position so that the shift lever moves more greatly at the corresponding shift position.

The gear transmission mechanism may be configured to be shiftable to at least Forward High, Forward Low, Neutral, and Reverse.

The gear transmission mechanism may be configured to be disposed behind and below a seat of the vehicle.

The push-pull cable may be configured so that it extends downwardly from a coupled end portion with the shift-lever, and pass through under a floor below the steering handle and through under the seat behind the floor, and coupled with the shift shaft of the gear transmission mechanism at a rear end portion thereof.

The gear transmission mechanism may be configured so that it is provided to a swing arm which is swingably provided in the vertical direction in a rear portion of a main frame of the vehicle. The swing arm may support rear wheels of the vehicle.

At least one of other sub-passages may be expanded to a proximal side to the sub-passage corresponding to the Neutral position to prevent the shift lever from moving toward the main passage.

The above and further objects and features of the invention will more fully be apparent from the following detailed description with accompanying drawings.

DETAILED DESCRIPTION OF THE INVENTION

The present invention will now be described in detail referring to the accompanying drawings illustrating the embodiments thereof.

Figure 1:
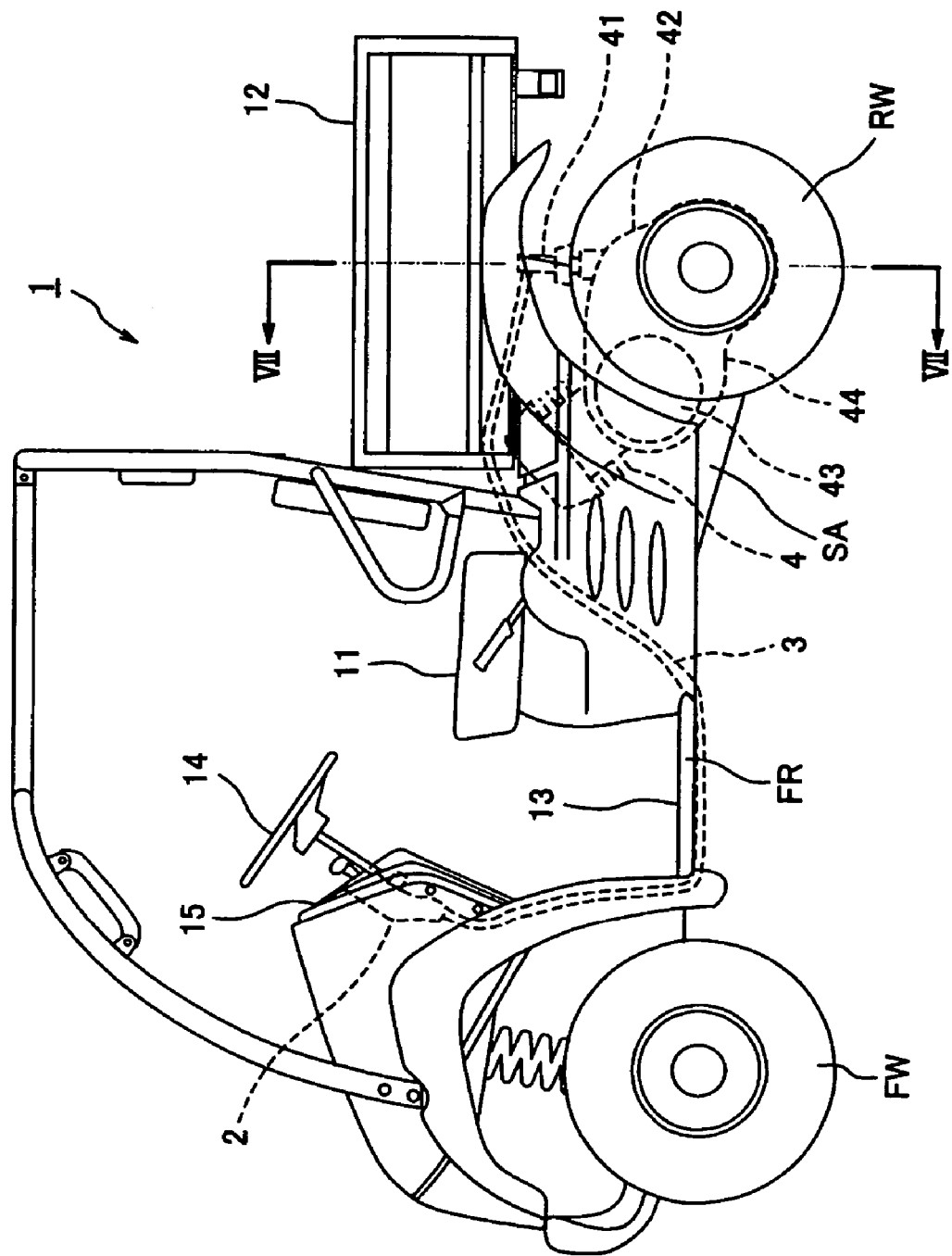
FIG. 1 is a schematic left side view of a vehicle equipped with a shift-lever device according to an embodiment of the present invention.

FIG. 1 is a schematic left side view showing a vehicle 1 equipped with a shift-lever device according to an embodiment of the present invention. In FIG. 1, although the vehicle 1 is illustrated as a four-wheel utility vehicle with a single row bench seat, the vehicle 1 may also be a four-wheel utility vehicle with plural rows of seats. Further, the vehicle may be any other type of vehicle.

The vehicle 1 includes a pair of front wheels FW and a pair of rear wheels RW, both of which are supported by a vehicle main frame FR. The rear wheels RW are supported by a rear portion of the main frame FR through a swing arm SA which is swingably supported in the vertical direction by the rear portion of the main frame FR. Furthermore, the vehicle 1 includes a cargo bed 12 provided behind the seat 11. In this embodiment, the seat is a bench seat in which a driver's seat and a passenger seat are integrated in one piece. Below the cargo bed 12 and immediately behind the seat 11 are an engine 4 and an automatic continuously-variable transmission 44 which is connected to a downstream side in a power train of the engine 4. The continuously-variable transmission 44 is configured to be automatically shifted into an appropriate gear ratio during traveling. Further downstream side in the power train of the continuously-variable transmission 44 is a gear transmission mechanism 42 provided adjacent the continuously-variable transmission 44. The gear transmission mechanism 42 is configured such that it allows a driver to shift gears between Forward High (H), Forward Low (L), Neutral (N), and Reverse (R). The engine 4 and the gear transmission mechanism 42 are both disposed on the swing arm SA.

Figure 7:
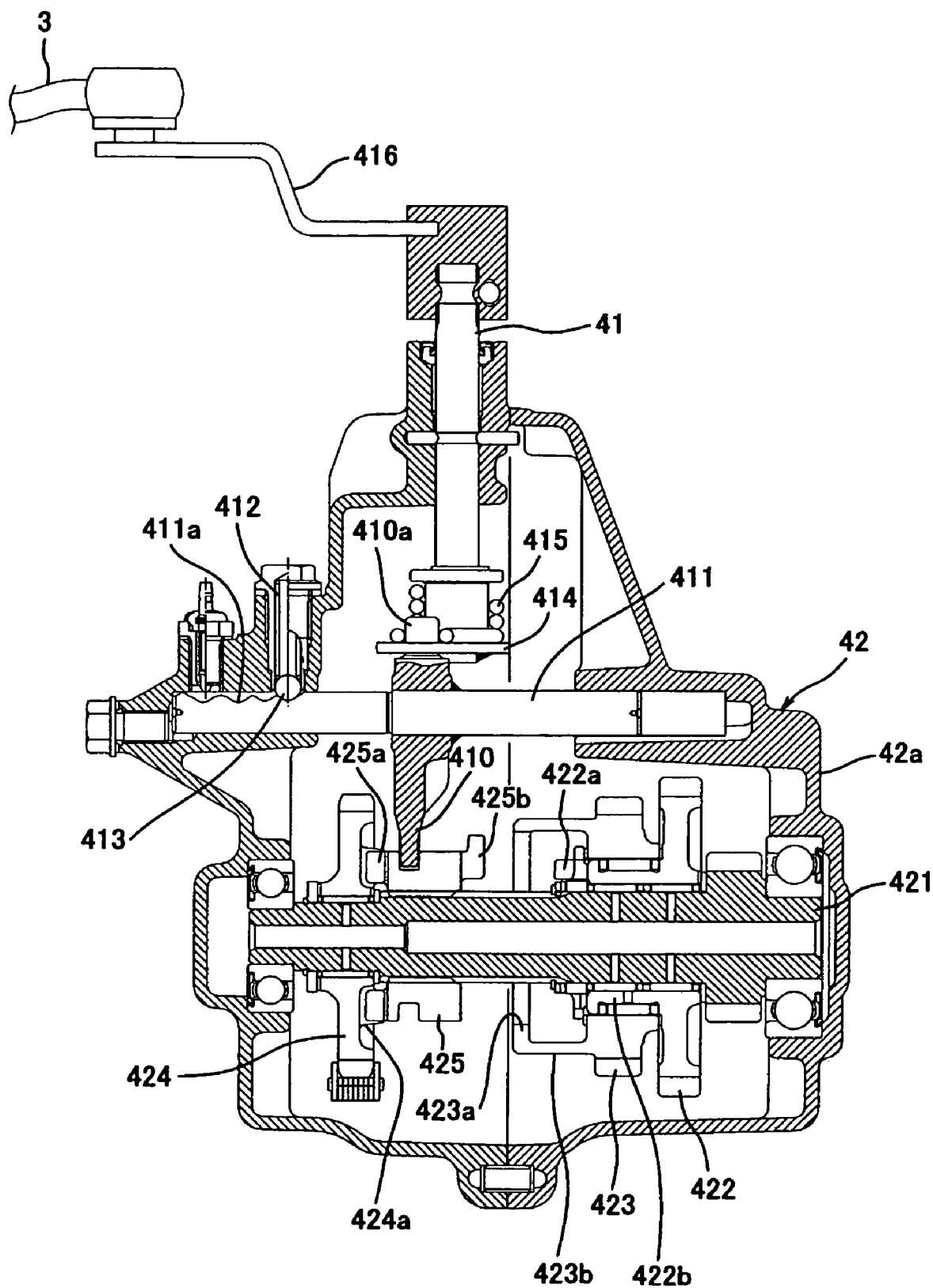
FIG. 7 is a cross-sectional view taken along a line VII-VII of FIG. 1, which shows a configuration of a gear transmission mechanism in a Reverse position.
Figure 8:
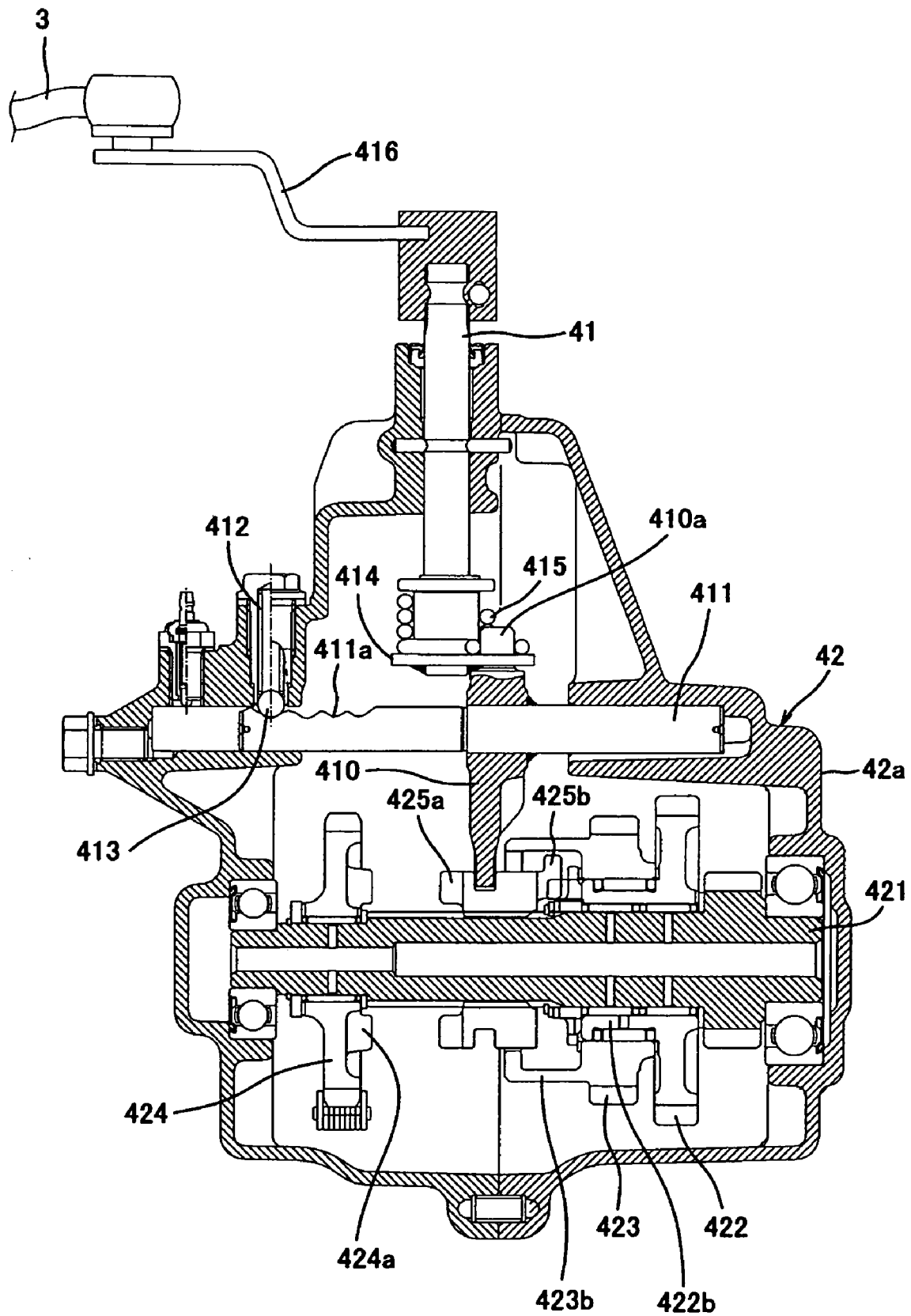
FIG. 8 is also the VII-VII sectional view of FIG. 1, but shows a configuration of the gear transmission mechanism in a Forward Low position.

The gear transmission mechanism 42 is configured to be shiftable by a single shift fork 410, as shown in FIGS. 7 and 8. FIGS. 7 and 8 are cross-sectional views taken along a line VII-VII of the FIG. 1 showing only the gear transmission mechanism portion. Inside a casing 42a of the gear transmission mechanism 42 are a transmission input shaft 421 to which power is transmitted from an output shaft (not shown) of the continuously-variable transmission 44, an output shaft (not shown) which is arranged in parallel to the input shaft 421. A Forward High gear 423 and a Forward Low gear 422 are arranged on the right-hand side of the input shaft 421, and a Reverse gear 424 is arranged on the left-hand side of the input shaft 421.

Between the Forward High gear 423 and the Forward Low gear 422, and the Reverse gear 424, a single shift sleeve 425 is spline-fitted on the input shaft 421 so as to be movable in the axial direction.

The Reverse gear 424 is provided with dog teeth 424a on the right side face thereof, and it is rotatably fitted on the transmission input shaft 421 through a needle bearing. The Forward Low gear 422 is provided with a cylindrical boss portion 422b which axially extends to the left and passes through the inner circumference of the Forward High gear 423. Dog teeth 422a are formed in a tip-end portion of the boss portion 422b. The Forward Low gear 422 is rotatably fitted on the transmission input shaft 421 through a needle bearing. The Forward High gear 423 is provided with a cylindrical arm portion 423b which axially extends to the left, and dog teeth 423a are formed in an inner peripheral surface of a tip-end portion of the arm portion 423b. The Forward High gear 423 is rotatably fitted on an outer peripheral surface of the boss portion 422b of the Forward Low gear 422.

Dog teeth 425a for Reverse which can be engaged with the dog teeth 424a of the Reverse gear 424 are formed on the left side face of the shift sleeve 425. L-shaped Dog teeth 425b for Forward which can be engaged with either the dog teeth 423a of the Forward High gear 423 or the dog teeth 422a of the Forward Low gear 422 are formed on the right side face of the shift sleeve 425.

Typically, an interval in the axial direction between the dog teeth 423a for Forward High and the dog teeth 422a for Forward Low is assured at least such that the dog teeth 425b for Forward of the shift sleeve 425 can be once in a Neutral state between the dog teeth 423a and dog teeth 422a.

A single shift fork 410 is fitted in an annular groove formed in an outer peripheral surface of the shift sleeve 425. The single shift fork 410 is fixed to a shift rod 411 which is movably supported by a casing 42a in the right-and-left direction so that the shift fork 410 can move in the right-and-left direction together with the shift rod 411.

FIG. 7 shows the shift fork 410 in a Reverse state. From this Reverse state when the shift fork 410 is moved to the right, the dog teeth 425a for Reverse of the shift sleeve 425 separates from the dog teeth 424a of the Reverse gear 424, and thus the gear transmission mechanism 42 is shifted to a Neutral state. When the shift fork 410 moves to further right, first, the dog teeth 425b for Forward of the shift sleeve 425 engage with the dog teeth 423a of the Forward High gear 423, and then through the Neutral state between the dog teeth 423a and 422a for Forward Low gear 422, the dog teeth 425b engage with the dog teeth 422a of the Forward Low gear 422 as shown in FIG. 8. That is, the gear transmission mechanism 42 is configured to be shiftable between four positions, Forward High (H), Forward Low (L), Neutral (N), and Reverse (R), according to the movement of the single shift fork 410 in the axial direction.

Four Notches 411a, for causing a click and securing the shift sleeve 425 in positions, are formed in a left end portion of the shift rod 411 with a predetermined interval in the axial direction. A ball 413 which is biased by a spring 412 engages with the notches 411a one at a time. The notches 411a are, from right to left, for Reverse, for Neutral, for Forward High, and for Forward Low respectively.

An upper end portion of the shift fork 410 extends above the shift rod 411, and it is provided with a shift-arm-pin portion 410a which is rotatably supported by an elongated hole formed in a swinging end portion of an inner shift-arm portion 414. The inner shift-arm portion 414 is welded at a base end thereof to a lower end portion of a shift shaft 41 which extends in the vertical direction. A clearance between the shift-arm-pin portion 410a of the shift fork 410 and the elongated hole formed in the inner shift-arm portion 414 is compensated by a torsion spring 415 wrapped around periphery of a lower end portion of the shift shaft 41.

While an upper end portion of the shift shaft 41 is rotatably supported by the casing 42a about its own axis, the upper end portion projects from the casing 42a to outside, and an outer shift-arm portion 416 in a crank-shape extended to the left is fixed to the projected end portion of the shift shaft 41. A rear end portion of a push-pull cable 3 is connected to a tip-end portion of the outer shift-arm portion 416.

With the above configuration of the gear transmission mechanism 42, by pulling the push-pull cable 3 to the front, the shift shaft 41 rotates clockwise when seen from above, and then the shift fork 410 moves to the left. On the contrary, by pushing the push-pull cable 3 to the rear, the shift shaft 41 rotates counterclockwise when seen from above, and then the shift fork 410 moves to the right. By this action, the gear transmission mechanism 42 is able to shift between four positions, Forward High (H), Forward Low (L), Neutral (N), and Reverse (R), as mentioned above.

Again with reference to FIG. 1, the push-pull cable 3 connected to the tip-end portion of the outer shift-arm portion 416 (FIG. 7) at the rear end portion extends under the seat 11, and passes through below a floor 13 in front of the seat 11 and below a steering handle 14 of the vehicle, further through a vehicle body portion in front of the floor 13, and to below a dashboard 15, while not being exposed outside. The dashboard 15 is provided with the steering handle 14 which is located in front of the seat 11, and located in front of and above the floor 13. A front end portion of the push-pull cable 3 is connected to a shift-lever device 2 inside the dashboard 15.

The shift-lever device 2 is disposed to the right-hand side of the steering handle 14, thereby allowing the driver operate the shift-lever device 2 with his/her right hand.

Figure 2:
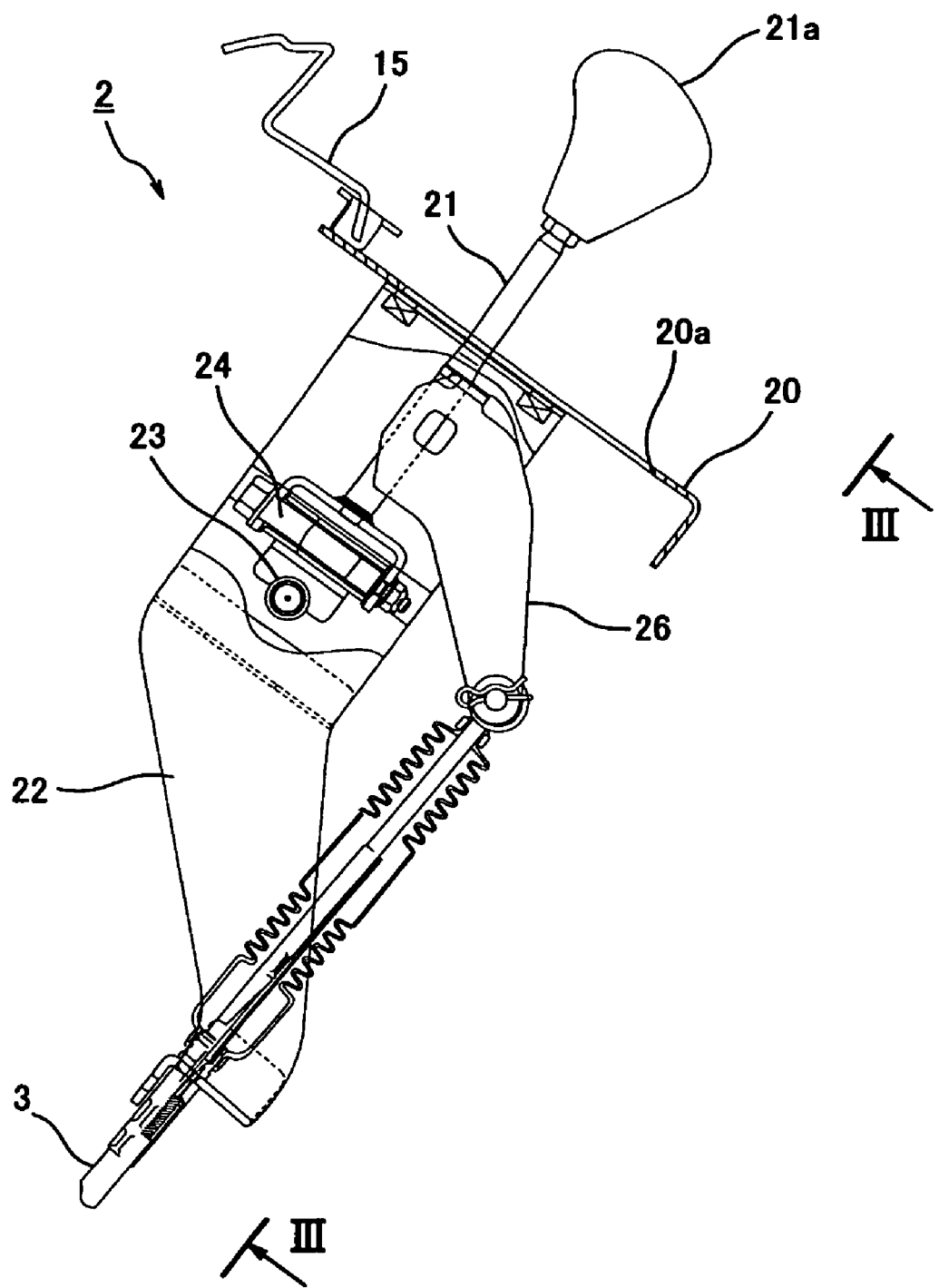
FIG. 2 is a partial cross-sectional enlarged view of the shift-lever device shown in FIG. 1.
Figure 3:
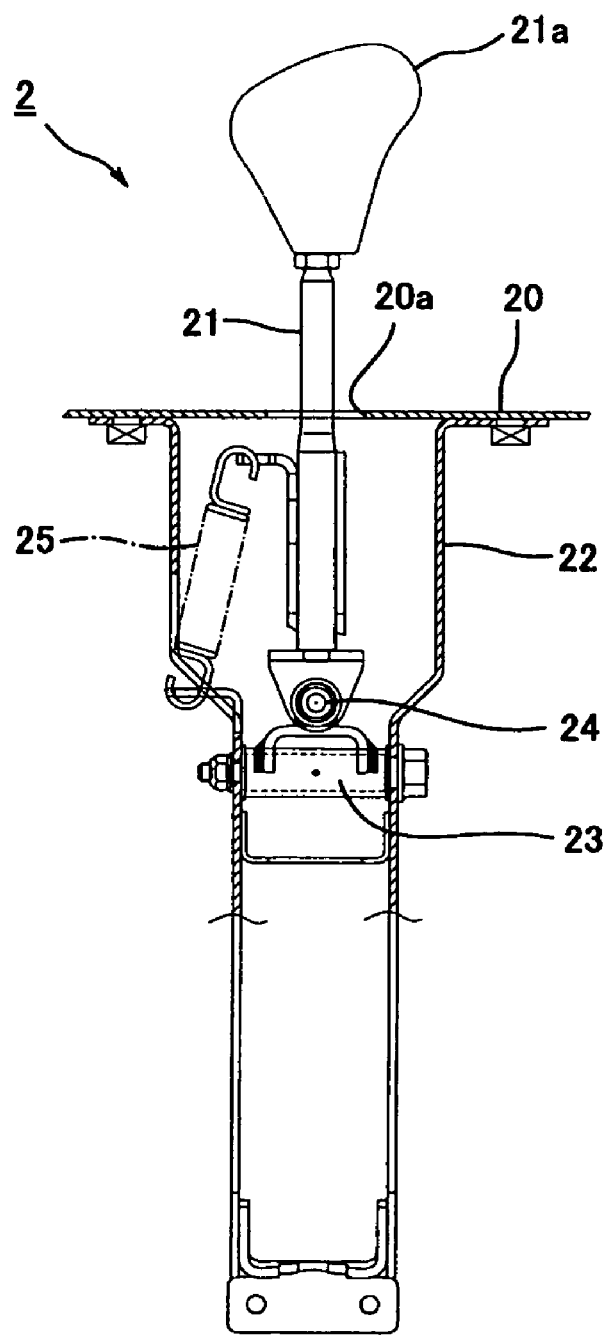
FIG. 3 is a partial cross-sectional view taken along a line III-III of FIG. 2.

As shown in FIG. 2 and FIG. 3, which shows a partial cross-sectional view taken along a line III-III of FIG. 2, the shift-lever device 2 includes a gate plate 20 which constitutes a part of the dashboard 15. A gate 20a is formed in the gate plate 20 to guide an operation of the shift lever 21.

An upper end portion of the shift lever 21 projects above the gate plate 20 through the gate 20a, and it is provided with a shift grip 21a. The shift lever 21 is pivotably attached to a casing 22 at a lower end portion thereof with two-degree-of-freedom.

The casing 22 of the shift-lever device 2 includes a pair of wall portions under a lower surface (that is, a back face) of the gate plate 20, spaced apart to the right and left while being in parallel to each other. A right-and-left direction shaft 23 penetrates both the wall portions at the halfway portion so as to be rotatable. A front-and-rear direction shaft 24 is welded to an upper portion of the right-and-left direction shaft 23 through a channel member. The lower end portion of the shift lever 21 is attached to the top of the front-and-rear direction shaft 24 through a channel member so as to be rotatable around the front-and-rear direction shaft 24.

As shown in FIG. 3, between the left side of the shift lever 21 and the left-hand side wall portion of the casing 22, a spring 25 is provided and biases the shift lever 21 to the left.

As shown in FIG. 2, to the rear of the shift lever 21, a lever portion 26 extends downwardly, and the front end portion of the push-pull cable 3 is connected to a tip-end portion of the lever portion 26. In FIG. 3, an illustration of the connection of the push-pull cable 3 is omitted.

With the above configuration, the shift lever 21 with the two-degrees-of-freedom is configured to be operable such that it follows the shape of the gate 20a while being biased to the left by the spring 25.

Figure 4:
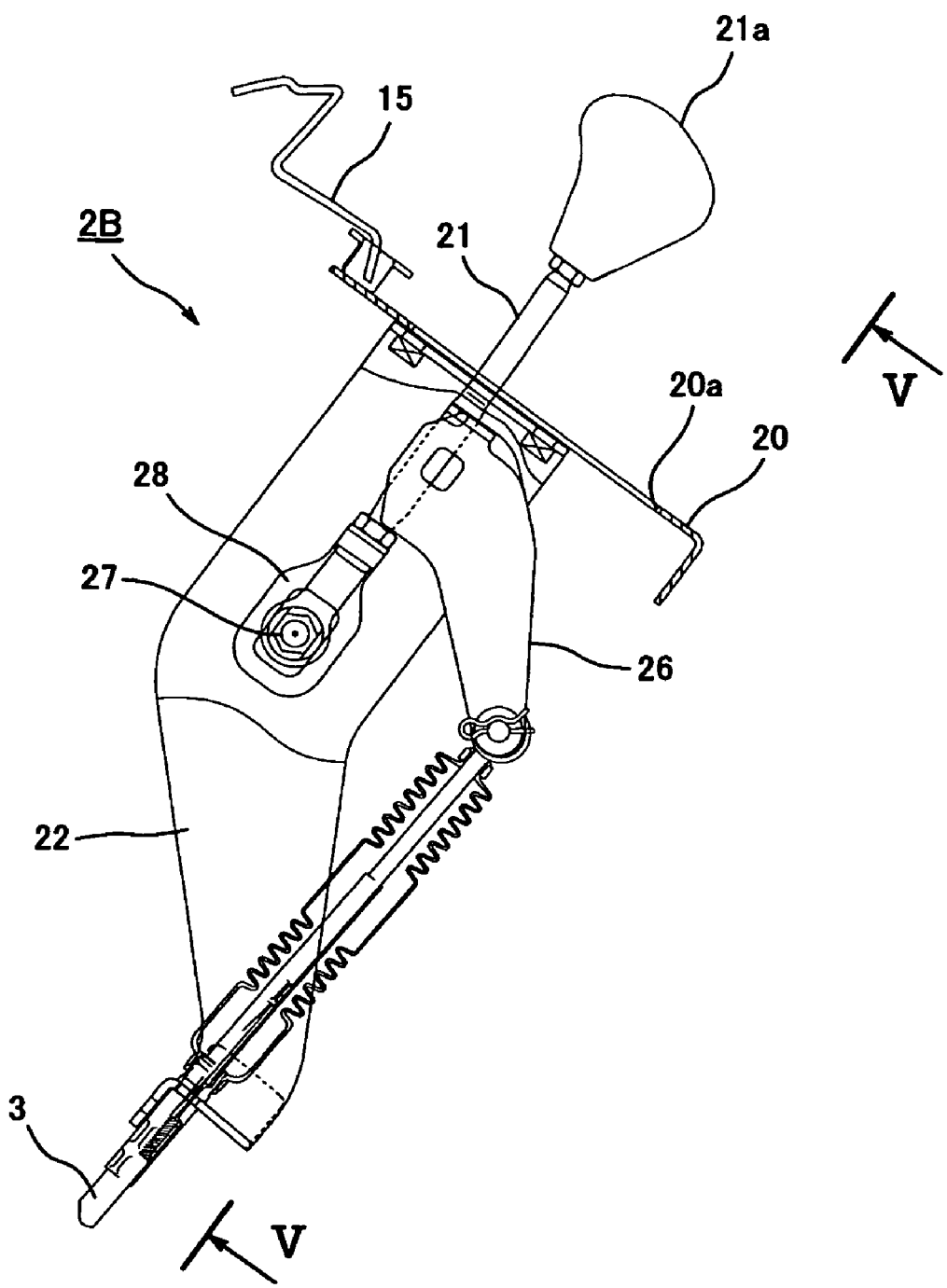
FIG. 4 is a partial cross-sectional enlarged view of another example of the shift-lever device shown in FIG. 1.
Figure 5:
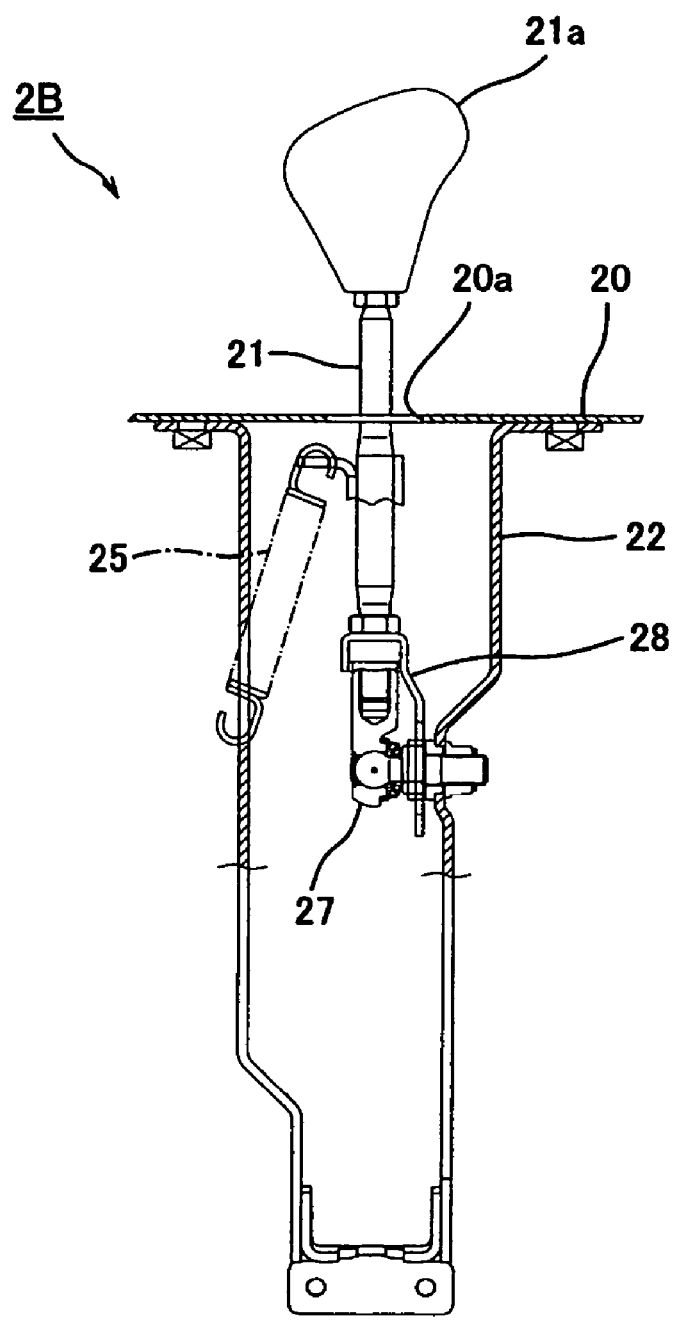
FIG. 5 is a partial cross-sectional view taken along a line V-V of FIG. 4.

An alternative support structure of the shift lever 21 may be as shown in FIG. 5 which is a partial cross-sectional view taken along a line V-V of FIG. 4. In this shift-lever device 2B, the shift lever 21 is pivotably coupled with the right wall of the casing 22 at a lower end portion thereof with three-degrees-of-freedom by a ball joint 27. If nothing further is done, it can be difficult for the driver to operate the shift lever 21, because the shift lever 21 is free of rotation around its axis. Thus, in this embodiment, a bracket 28 is provided to restrict the rotation of the shift lever 21 around its axis, thereby reducing it down to two-degrees-of-freedom.

Figure 6:
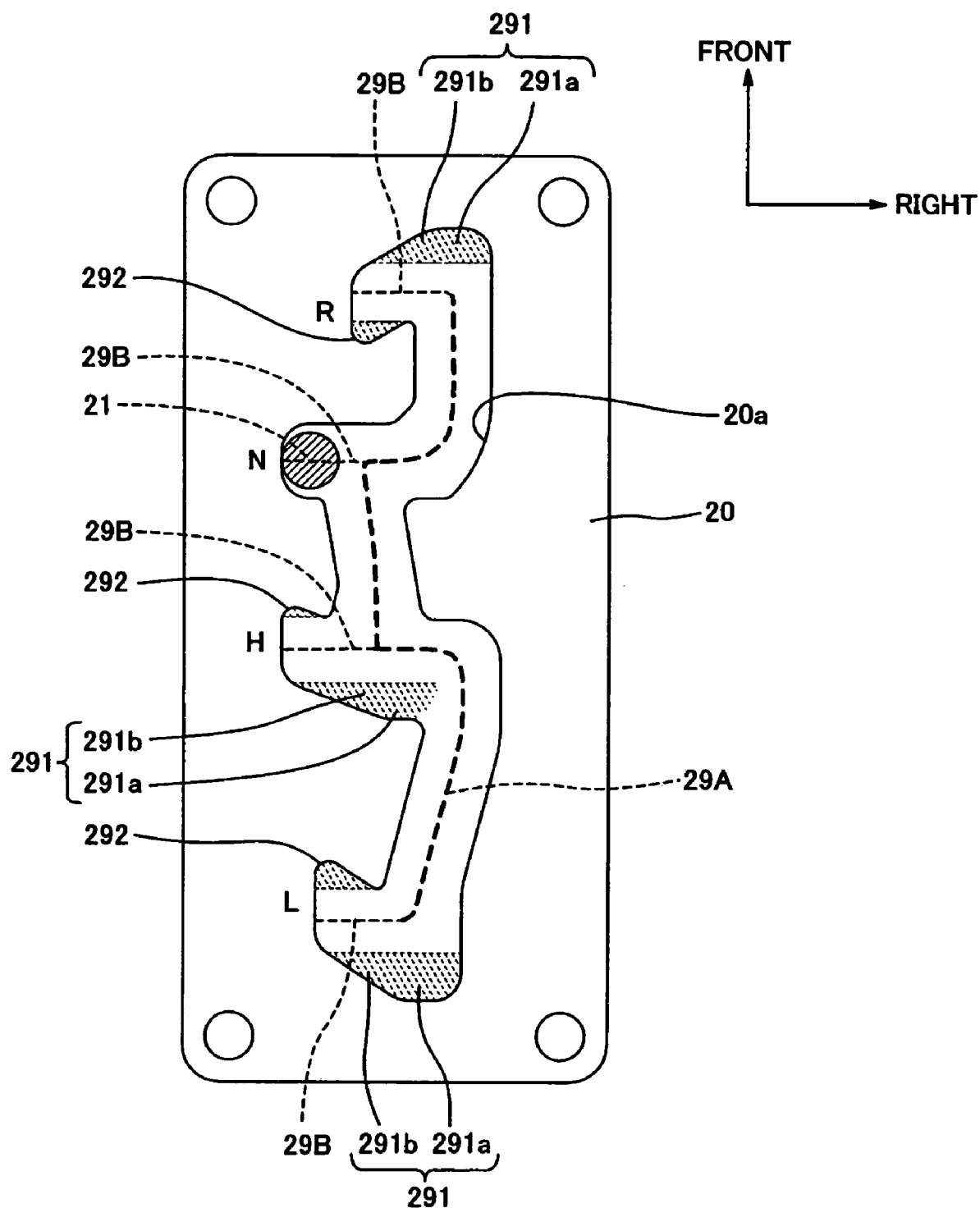
FIG. 6. is a view showing a gate shape of the shift-lever device shown in FIG. 1.

As shown in FIG. 6, the gate 20a which guides the operation of the shift lever 21 includes a main passage 29A (shown with a thick dashed line in FIG. 6), extended substantially in the front-and-rear direction, and sub-passages 29B (shown with thin dashed lines in FIG. 6) extended to the left, respectively from each of the shift positions along the main passage 29A.

The shift positions are, from front, Reverse (R), Neutral (N), Forward High (H), and Forward Low (L). For example, the driver may push the shift lever 21 forward from the Neutral position into the Reverse position. At this time, the shift lever 21 lifts the lever portion 26 (see FIGS. 2 and 4), and the lever portion 26 pulls the push-pull cable 3 upwardly. Then the push-pull cable 3 pulls the outer shift-arm portion 416 forward, thereby shifting the gear transmission mechanism 42 into the Reverse position.

Similarly, the driver may pull the shift lever 21 rearward to return the shift lever 21 into the Neutral position. At this time, the shift lever 21 lowers the lever portion 26, and the lever portion 26 pushes the push-pull cable 3. Then the push-pull cable 3 pushes the outer shift-arm portion 416 rearward, thereby shifting the gear transmission mechanism 42 into the Neutral position.

The driver may further pull the shift lever 21 rearward to move the shift lever 21 into the Forward High position. At this time, the shift lever 21 further lowers the lever portion 26, and the lever portion 26 further pushes the push-pull cable 3. Then the push-pull cable 3 further pushes the outer shift-arm portion 416 rearward, thereby shifting the gear transmission mechanism 42 into the Forward High position.

The driver may further pull the shift lever 21 rearward to move the shift lever 21 into the Forward Low position. At this time, the shift lever 21 further lowers the lever portion 26, and the lever portion 26 further pushes the push-pull cable 3. Then the push-pull cable 3 further pushes the outer shift-arm portion 416 rearward and, thereby shifting the gear transmission mechanism 42 into the Forward Low position.

As shown in FIG. 6, the main passage 29A has a shape such that a section between the Neutral position and the Forward High position is offset to the left. This offset prevents the shift lever 21 from moving into the Reverse position directly from the Forward High position. Further, the gate 20a has a passage width such that it is slightly wider than the diameter of the stem portion of the shift lever 21 to assure a smooth operation of the shift lever 21. The section of the shift lever 21 is shown in FIG. 6.

For the three shift positions other than the Neutral position, respective sub-passage 29B includes an expanded portion 291 which is an extra gate space formed on a distal side from the Neutral position. The expanded portion 291 constitutes an extended area 291a and an inclined area 291b. The extended area 291a is formed as an extended area in width of the sub-passage 29B, on the side away from the Neutral position. The inclined area 291b is formed as an inclined area to smoothly connect a dead end portion of the respective shift position and the extended area 291 so that it assures a smooth operation of the shift lever 21 into and out from the dead end portion.

The above-mentioned extra gate space is formed to allow an extra amount of push or pull of the shift lever 21 at each of the shift positions such as when moving the shift lever 21 to the Reverse position from the Neutral position, to the Forward High position from the Neutral position, and further, to the Forward Low position from the Forward High position, or when moving the shift lever 21 directly to the Forward Low position from the Neutral position. The extra gate space allows compensation of the clearance of the push-pull cable 3 when it is pushed or pulled. Therefore, it will be appreciated by those skilled in the art that the size of the expanded portion 291 in the front-and-rear direction can be determined based on the size of the clearance of the push-pull cable 2.

In this embodiment, since all of the sub-passages 29B extend to the left of the main passage 29A, the shift lever 21 is secured in the sub passage 29B corresponding to one of the shift positions by a biasing force of the spring 25 when the shift lever 21 is moved along the main passage 29A to the shift position.

Similarly, as shown in FIG. 6, the three sub-passages 29B other than the Neutral position may include a pocket portion 292 formed on a proximal side to the Neutral position. The pocket portion 292 helps hold the shift lever 21 in each shift position once it is positioned in the sub-passage 29B.

As mentioned above, the shift-lever device ensures reliable movement of the shift fork, thus ensuring a reliable gear shift, without extinguishing the advantages of the push-pull cable adoption. The gate which guides the shift lever movement is formed in a shape such that the shift lever is possible to move further beyond the shift position as much as the clearance of the push-pull cable.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A shift-lever device being disposed in proximity to one side of a steering handle of a vehicle, comprising:
   a single shift lever provided so as to be pivotable; and
   a gate plate having a gate through which the shift lever is inserted up to a predetermined length to be guided in a shift operation thereof;
   wherein the shift-lever device is configured to be coupled with a single shift shaft of a gear transmission mechanism through a single push-pull cable so as to operate the single shift shaft of the gear transmission mechanism;
   wherein the gear transmission mechanism is configured so that the single shift shaft interlocks with a single shift fork to shift gears of the gear transmission mechanism;
   wherein the gate has a shape such that the shift lever is movable more greatly at each of shift positions as much as a clearance between an outer casing and an inner cable of the push-pull cable;
   wherein the gate includes:
      a main passage, which extends substantially in the front-and-rear direction of the vehicle, for guiding the shift lever in a direction in which the shift lever pushes and pulls the push-pull cable; and
      a plurality of sub-passages, which extend to one side of the main passage substantially perpendicular to the main passage from each of shift positions along the main passage corresponding to gear positions of the shift fork, for sustaining the shift lever to the shift position;
   wherein one of the plurality of sub-passages corresponds to a Neutral position of the gear transmission mechanism, while the other sub-passages include an expanded portion which is an extra gate space formed on a side wall thereof which is located on far side from the sub-passage of the Neutral position;
   wherein the expanded portion has an extended area formed by extending the main passage in a direction away from the Neutral position and an inclined area which is configured to smoothly connect the extended area and a dead end portion of the respective sub-passage and configured to be inclined to be close to the Neutral position toward the dead end portion; and
   wherein the other sub-passages have a pocket portion formed on a side wall thereof which is located on a proximal side to the sub-passage corresponding to the Neutral position to prevent the shift lever from moving toward the main passage.

2. The shift-lever device of claim 1, wherein the gear transmission mechanism is configured to be shiftable to at least Forward High, Forward Low, Neutral, and Reverse.

3. The shift-lever device of claim 1, wherein the gear transmission mechanism is configured to be disposed behind and below a seat of the vehicle.

4. The shift-lever device of claim 3, wherein the gear transmission mechanism is configured so that it is provided to a swing arm which is swingably provided in the vertical direction in a rear portion of a main frame of the vehicle, wherein the swing arm supports rear wheels of the vehicle.

5. The shift-lever device of claim 4, wherein the push-pull cable is configured so that it extends downwardly from a coupled end portion with the shift-lever device, and passes under a floor below the steering handle and under the seat behind the floor, and coupled with the shift shaft of the gear transmission mechanism at a rear end portion thereof.

* * * * *